(12) United States Patent
Lindoff et al.

(10) Patent No.: US 7,965,780 B2
(45) Date of Patent: Jun. 21, 2011

(54) DETERMINATION OF PRE-CODING MATRIX INDICATORS FOR SPATIAL MULTIPLEXING IN A MOBILE COMMUNICATIONS SYSTEM

(75) Inventors: Bengt Lindoff, Bjärred (SE); Fredrik Nordström, Lund (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 808 days.

(21) Appl. No.: 11/957,118

(22) Filed: Dec. 14, 2007

(65) Prior Publication Data

US 2009/0154577 A1 Jun. 18, 2009

(51) Int. Cl.
*H04L 27/28* (2006.01)
(52) U.S. Cl. .......................... 375/260
(58) Field of Classification Search .................. 375/260, 375/265, 267, 285, 295, 299, 316, 340, 358; 455/101–102, 115.1, 450, 24; 370/334, 465, 370/468
See application file for complete search history.

(56) References Cited

U.S. PATENT DOCUMENTS

| | | | |
|---|---|---|---|
| 2005/0094550 A1* | 5/2005 | Huh et al. | 370/203 |
| 2006/0098760 A1* | 5/2006 | Shen et al. | 375/299 |
| 2007/0249296 A1* | 10/2007 | Howard et al. | 455/101 |
| 2008/0025336 A1* | 1/2008 | Cho et al. | 370/432 |
| 2009/0036150 A1* | 2/2009 | Liao et al. | 455/501 |
| 2009/0093222 A1* | 4/2009 | Sarkar | 455/115.1 |
| 2010/0061482 A1* | 3/2010 | Lee et al. | 375/296 |

OTHER PUBLICATIONS

U.S. Appl. No. 60/977,359, filed Oct. 3, 2007.*

PCT Written Opinion, mailed Jul. 23, 2009, in connection with International Application No. PCT/EP2008/067026.
PCT International Search Report, mailed Jul. 23, 2009, in connection with International Application No. PCT/EP2008/067026.
Jihoon, Choi et al. "Interpolation Based Unitary Precoding for Spatial Multiplexing MIMO_OFDM with Limited Feedback" IEEE Transactions on Signal Processing, IEEE Service Center, New York, NY, US, vol. 54, No. 12, Dec. 1, 2006, pp. 4730-4740. XP011150614, ISSN: 1053-587X.
Jihoon, Choi et al. "Interpolation based unitary precoding for spatial multiplexing MIMO-OFDM with limited feedback" Global Telecommunications Conference, 2004. IEEE Dallas, Texas, USA, Nov. 29-Dec. 3, 2004, Piscataway, NJ, USA, IEEE, vol. 1, Nov. 29, 2004, pp. 214-218, XP010758883, ISBN: 978-0-7803-8794-2.
Yi, L. et al. "Interpolation-based precoding with limited feedback for MIMO-OFDM systems" Aug. 2, 2007, vol. 1, No. 4, pp. 679-683, XP006029250.
Khaled, N. et al. "Interpolation-Based Multi-Mode Precoding for MIMO-OFDM Systems with Limited Feedback" IEEE Transactions on Wireless Communications, IEEE Service Center, Piscataway, NJ, US, vol. 6, No. 3, Mar. 1, 2007, pp. 1003-1013, XP011184326, ISSN: 1536-1276.

(Continued)

*Primary Examiner* — Khanh C Tran
(74) *Attorney, Agent, or Firm* — Potomac Patent Group PLLC (57) ABSTRACT

A pre-coding matrix is determined in an OFDMA, multiple transmit antenna communication system having a number of sub-carriers grouped into a number, M, of resource blocks. This involves determining a frequency selectivity of a channel through which received signals have propagated. A number N of selected resource blocks is then determined as a function of the frequency selectivity the N selected resource blocks being those for which pre-coding matrices will be determined, wherein N<M. The pre-coding matrices are then determined for the N selected resource blocks. Pre-coding matrices for a remaining M−N of the M resource blocks are determined by means of interpolation applied to the N pre-coding matrices determined for the N selected resource blocks.

22 Claims, 8 Drawing Sheets

OTHER PUBLICATIONS

Khaled, N. et al. "Quantized multi-mode precoding for spatial multiplexing MIMO-OFDM system" Vehicular Technology Conference, 2005, VTC-2005-Fall. 2005 IEEE 62nd Dallas, Texas, USA, Sep. 25-28, 2005, Piscataway, NJ, USA, IEEE, vol. 2, Sep. 25, 2005, pp. 867-871, XP010878607, ISBN: 978-0-7803-9152-9.

* cited by examiner

FIG. 1

| Tx Rank | Codebook per Rank | Size per Rank | Total Size |
|---|---|---|---|
| 1 | $\begin{bmatrix}\sqrt{2}\\0\end{bmatrix},\begin{bmatrix}0\\\sqrt{2}\end{bmatrix},\begin{bmatrix}1\\1\end{bmatrix},\begin{bmatrix}1\\-1\end{bmatrix},\begin{bmatrix}1\\j\end{bmatrix},\begin{bmatrix}1\\-j\end{bmatrix}$ | 6 | 9 |
| 2 | $\begin{bmatrix}1&0\\0&1\end{bmatrix},\begin{bmatrix}1&1\\1&-1\end{bmatrix}/\sqrt{2},\begin{bmatrix}1&1\\j&-j\end{bmatrix}/\sqrt{2}$ | 3 | |

DETERMINATION OF PRE-CODING MATRIX INDICATORS FOR SPATIAL MULTIPLEXING IN A MOBILE COMMUNICATIONS SYSTEM

BACKGROUND

The present invention relates to generally to communication systems that employ a plurality of transmit antennas, and more particularly to the determination of Pre-coding Matrix Indicator (PMI) feedback from User Equipment (UE) to a communication system network node responsible for physical-layer processing.

In the forthcoming evolution of the mobile cellular standards like the Global System for Mobile Communication (GSM) and Wideband Code Division Multiple Access (WCDMA), new transmission techniques like Orthogonal Frequency Division Multiplexing (OFDM) are likely to occur. Furthermore, in order to have a smooth migration from the existing cellular systems to the new high capacity high data rate system in existing radio spectrum, a new system has to be able to utilize a bandwidth of varying size. A proposal for such a new flexible cellular system, called Third Generation Long Term Evolution (3G LTE), can be seen as an evolution of the 3G WCDMA standard. This system will use OFDM as the multiple access technique (called OFDMA) in the downlink and will be able to operate on bandwidths ranging from 1.25 MHz to 20 MHz.

Furthermore, data rates up to 100 Mb/s will be supported for the largest bandwidth. This is made possible, at least in part, by employing, in the downlink direction, a MIMO scheme based on spatial multiplexing including pre-coding. Such a strategy increases channel capacity by exploiting the radio channel characteristics. This is achieved by letting the signal(s) be spread out over the transmitter antennas by proper weighting. The weights form a pre-coding matrix. The weights should be chosen such that the Signal-to-Noise Ratio (SNR) at the receiver antenna(s) will be maximized according to some criteria. Processing, called "pre-coding", at the transmitter conditions the signals so that they will arrive at the receiver with different spatial signatures. The receiver also has one or more antennas. When the spatial signatures of the received signals are sufficiently different from one another, the concurrently transmitted signals do not substantially interfere with one another and the receiver is able to separate these into separate channels.

In order for the transmitter to achieve a suitable pre-coding that will achieve the desired spatial signatures at the receiver, the transmitter needs to have information about the channel through which the plurality of antenna signals are transmitted to the one or more receiver antennas. A common approach is to have the receiver estimate the channel and decide on a suitable pre-coding matrix from a set of available pre-coding matrices (called the "pre-coder code-book"). Information about the selected pre-coding matrix is then fed back from the receiver to the transmitter.

Figure 1:
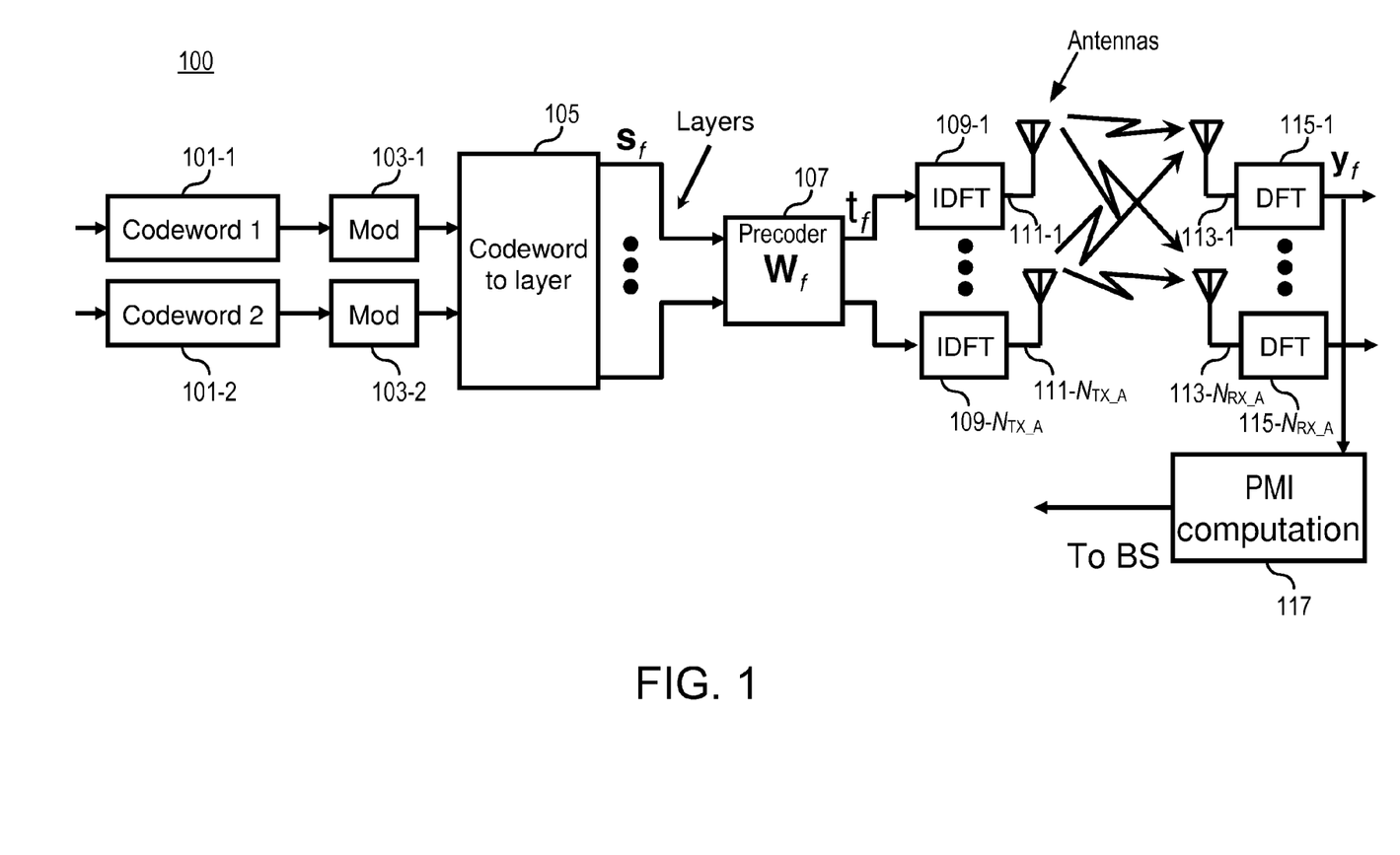
FIG. 1 is a block diagram illustrating a communications system employing such a scheme.

FIG. 1 is a block diagram illustrating a communications system 100 employing such a scheme. In this example, two codewords 101-1, 101-2 are presented for transmission. (In other embodiments, more than two codewords at a time could be presented for transmission.) Each codeword 101-1, 101-2 is supplied to a respective one of two modulators 103-1, 103-2. The modulated codewords are supplied to a codeword to layer mapper 105, which provides de-multiplexing of the modulation symbols of each codeword into one or multiple layers. The number of layers is always at least as many as the number of codewords to be transmitted. The output of the codeword to layer mapper 105 is a block of vectors $s_f = [s^{(0)}, \ldots, s^{(v)}]^T$. (The subscript "f" in this and other vectors is used to indicate that the variable resides in the frequency domain.)

The vector $s_f$ is supplied to a precoder 107, which extracts exactly one modulation symbol from each layer, jointly processes these symbols, and maps the result in the frequency and antenna domains. (Note: In the LTE standard, the number of antenna ports can be, but is not required to be, the same as the number of antennas.) The output of the precoder 107 is a vector $t_f = [\ldots t^{(p)} \ldots]^T$ to be mapped onto the antenna ports, where $t^{(p)}$ represents the signal for antenna port p. The mapping can be seen as a linear operation, that is, $t_f = W_f s_f$, where $W_f$ is a pre-coding matrix. The number of layers is always less than or equal to the number of antenna ports.

Each element of the vector $t_f$ is then supplied to a respective one of a number of Inverse Discrete Fourier Transforms (IDFT) 109-1, ..., 109-$N_{TX\_A}$, where $N_{TX\_A}$ is the number of transmit antennas. Each of the IDFTs 109-1, ..., 109-$N_{TX\_A}$ supplies its output to a respective one of $N_{TX\_A}$ transmit antennas 111-1, ..., 111-$N_{TX\_A}$.

Each of the $N_{TX\_A}$ transmit antennas 111-1, ..., 111-$N_{TX\_A}$ transmits its signal. The various transmitted signals are received by various ones of $N_{RX\_A}$ receiver antennas 113-1, ..., 113-$N_{RX\_A}$. Each of the receiver antennas 113-1, ..., 113-$N_{RX\_A}$ supplies its received signal to a respective one of $N_{RX\_A}$ Discrete Fourier Transforms (DFTs) 115-1, ..., 115-$N_{RX\_A}$. The output of the DFTs 115-1, ..., 115-$N_{RX\_A}$ is a vector, $y_f$, which is used in several ways. In one of these, it is further processed to obtain the transmitted information in accordance with conventional techniques, the description of which is beyond the scope of the invention.

Additionally, and of relevance to this invention, the vector $y_f$ is supplied to PMI computation logic 117. As mentioned earlier, the receiver needs to estimate the channel and either feed this information back to the transmitter directly, or alternatively (and more conventionally) decide on a suitable pre-coding matrix, which information is then feedback to the transmitter. In this exemplary embodiment, the PMI computation logic 117 estimates the channel, decides on a suitable pre-coding matrix $W_f$, and then feeds information about the selected pre-coding matrix back to the transmitter which, in the exemplary embodiment, is a NodeB (e.g., a base station of a mobile communication system). The information could be, for example, the pre-coding matrix $W_f$ itself, or alternatively, could be an index value that identifies a selected pre-coding matrix $W_f$ in a pre-coder code-book.

Figure 2:
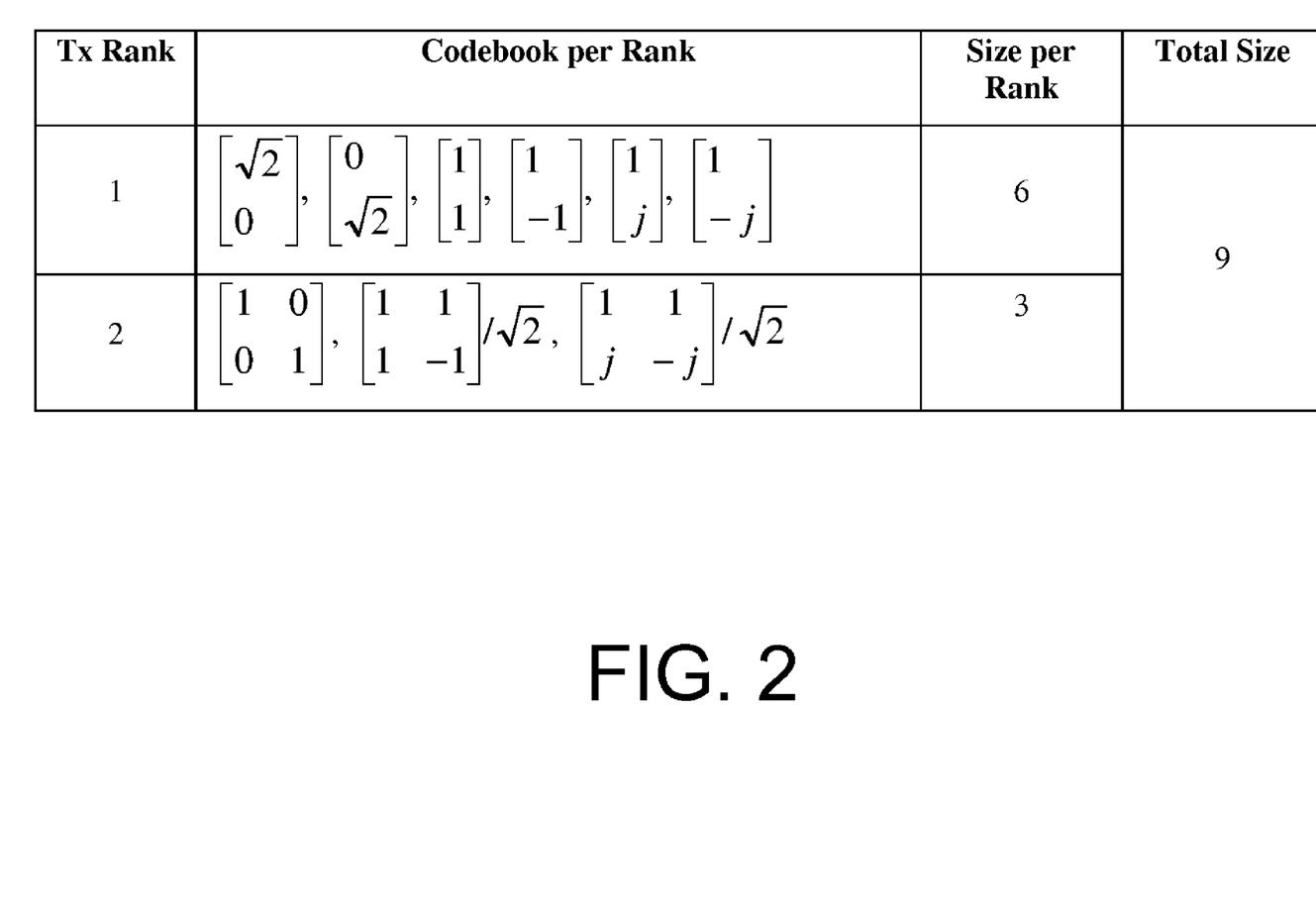
FIG. 2 is a table showing exemplary pre-coding matrices for the case of two antenna ports having a one layer case and a two layer case.

To date, the rate at which the UE is to compute the best pre-coding matrices has not been standardized in LTE. A present working assumption in LTE is that the UE will compute the best pre-coding matrices (i.e., the best PMI for all transmission ranks) with a granularity of once per 5 resource blocks, and feed back the information to the base station. There are different numbers of pre-coding matrices, depending on the number of layers and antenna ports. For example, for the case of two antenna ports, there are 6 pre-coding matrices for the one layer case, and 3 for the two layer case. The total number of matrices for the entire codebook is, in this example, 9. FIG. 2 is a table showing these in detail.

If one considers the case involving 4 antennas, it is likely that 64 different pre-coding matrices will need to be tested. When communication conditions involve a large bandwidth (e.g., 20 MHz) having up to 100 resource blocks, the requirement to compute the PMI for every 5 resource blocks for every subframe imposes an extremely complex and time consuming burden on the UE when conventional straightforward PMI computation methods are used. This in turn imposes harder demands on the UE processing capacity increasing cost and current consumption.

While the problem has been stated in the context of an LTE communication system, similar problems could arise in other communication systems involving MIMO transmissions.

Therefore, there is a need for methods and apparatuses capable of reducing the PMI derivation complexity without significantly degrading the quality of performance.

SUMMARY

It should be emphasized that the terms "comprises" and "comprising", when used in this specification, are taken to specify the presence of stated features, integers, steps or components; but the use of these terms does not preclude the presence or addition of one or more other features, integers, steps, components or groups thereof.

In accordance with one aspect of the present invention, the foregoing and other objects are achieved in methods and apparatuses for determining a pre-coding matrix in an OFDM, multiple transmit antenna (e.g., MIMO) communication system having a number of sub-carriers grouped into a number, M, of resource blocks. This involves determining a frequency selectivity of a channel through which received signals have propagated. A number N of selected resource blocks is then determined as a function of the frequency selectivity the N selected resource blocks being those for which pre-coding matrices will be determined, wherein N<M. The pre-coding matrices are then determined for the N selected resource blocks. Pre-coding matrices for a remaining M−N of the M resource blocks are determined by means of interpolation applied to the N pre-coding matrices determined for the N selected resource blocks.

In some alternative embodiments, determining the frequency selectivity of the channel through which received signals have propagated comprises determining a delay spread of the channel through which received signals have propagated; and determining the frequency selectivity based, at least in part, on the delay spread.

In other alternative embodiments, determining the frequency selectivity of the channel through which received signals have propagated comprises determining a power delay profile of the channel through which received signals have propagated; and determining the frequency selectivity based, at least in part, on the power delay profile.

In some embodiments, the pre-coding matrix update interval can be fixed. In yet alternative embodiments, it is dynamically determined by determining a Doppler error estimate of received signals; and using the Doppler error estimate to determine a pre-coding matrix update interval.

In still other alternative embodiments, determining, as a function of the frequency selectivity, the number N of selected resource blocks for which pre-coding matrices will be determined, wherein N<M, comprises determining a value for N; and determining an equidistantly-spaced set of N of the M resource blocks.

In yet other alternative embodiments, determining, as a function of the frequency selectivity, the number N of selected resource blocks for which pre-coding matrices will be determined, wherein N<M, comprises determining a channel response of a channel through which received signals have propagated, wherein the channel response spans sub-carriers associated with the M resource blocks; and determining which resource blocks are associated with sub-carriers at which a derivative of the channel response is zero.

In still other alternative embodiments determining, as a function of the frequency selectivity, the number N of selected resource blocks for which pre-coding matrices will be determined, wherein N<M, comprises determining a channel response of a channel through which received signals have propagated, wherein the channel response spans sub-carriers associated with the M resource blocks; and determining which resource blocks are associated with sub-carriers at which the channel response changes sign.

In yet other alternative embodiments, determining, as a function of the frequency selectivity, the number N of selected resource blocks for which pre-coding matrices will be determined, wherein N<M, comprises determining a channel response of a channel through which received signals have propagated, wherein the channel response spans sub-carriers associated with the M resource blocks; and determining which resource blocks are associated with sub-carriers at which a derivative of the channel response is greater than a threshold amount.

In still other alternative embodiments, determining, as a function of the frequency selectivity, the number N of selected resource blocks for which pre-coding matrices will be determined, wherein N<M, comprises using information about a previously determined set of N selected resource blocks for which pre-coding matrices were determined.

In yet other alternative embodiments, determining, as a function of the frequency selectivity, the number N of selected resource blocks for which pre-coding matrices will be determined, wherein N<M, comprises determining a coarse grid of resource blocks; determining pre-coding matrices for the coarse grid of resource blocks; determining additional resource blocks associated with sub-carriers located between pairs of the N selected resource blocks whose determined pre-coding matrices differ by more than a threshold amount; and determining pre-coding matrices for the additional resource blocks.

In another aspect of embodiments consistent with the invention, determining the pre-coding matrices for the N selected resource blocks comprises determining a channel response of a channel through which received signals have propagated, wherein the channel response spans sub-carriers associated with the M resource blocks; and determining the pre-coding matrices for the N selected resource blocks from the channel response.

BRIEF DESCRIPTION OF THE DRAWINGS

The objects and advantages of the invention will be understood by reading the following detailed description in conjunction with the drawings in which.

DETAILED DESCRIPTION

The various features of the invention will now be described with reference to the figures, in which like parts are identified with the same reference characters.

The various aspects of the invention will now be described in greater detail in connection with a number of exemplary embodiments. To facilitate an understanding of the invention, many aspects of the invention are described in terms of sequences of actions to be performed by elements of a computer system or other hardware capable of executing programmed instructions. It will be recognized that in each of the embodiments, the various actions could be performed by specialized circuits (e.g., discrete logic gates interconnected to perform a specialized function), by program instructions being executed by one or more processors, or by a combination of both. Moreover, the invention can additionally be considered to be embodied entirely within any form of computer readable carrier, such as solid-state memory, magnetic disk, optical disk or carrier wave containing an appropriate set of computer instructions that would cause a processor to carry out the techniques described herein. Thus, the various aspects of the invention may be embodied in many different forms, and all such forms are contemplated to be within the scope of the invention. For each of the various aspects of the invention, any such form of embodiments may be referred to herein as "logic configured to" perform a described action, or alternatively as "logic that" performs a described action.

The various embodiments consistent with the invention provide lower complexity PMI derivation in a UE operating in a multi-carrier system employing two or more transmit antennas (e.g., an OFDM MIMO system). In an aspect of some embodiments, the frequency selectivity of the radio channel is determined. This may be obtained from, for example, a power delay profile or the delay spread of the radio channel, each of which may be determined by known methods. An update interval to be used may be static, or may be determined dynamically from information about the Doppler frequency error. Such information can also be determined by known methods.

Based on the frequency selectivity, a subset of N PMI resource blocks (from among M possible PMI resource blocks) are computed. The PMI for the remaining M–N resource blocks are interpolated using the N determined resource blocks. If the channel has low frequency selectivity, the value of N can be low, whereas if the channel has large frequency selectivity, N should be a large value.

In an aspect of alternative embodiments, N resource blocks at which the PMI is computed are determined based on the frequency-domain channel estimate (i.e., the estimated channel determined using reference symbols that are included within NodeB transmissions). The PMI for the remaining M–N resource blocks are interpolated using the N determined resource blocks.

In yet other alternative embodiments, determining the set of N resource blocks at which the PMI is to be computed involves using previously determined PMIs (i.e., positions used in the last number of sub-frames).

Other embodiments employ combinations of the above-described aspects.

Still other embodiments employ iteration to compute the PMI.

These and other aspects of embodiments consistent with the invention are described in further detail in the following.

Figure 3:
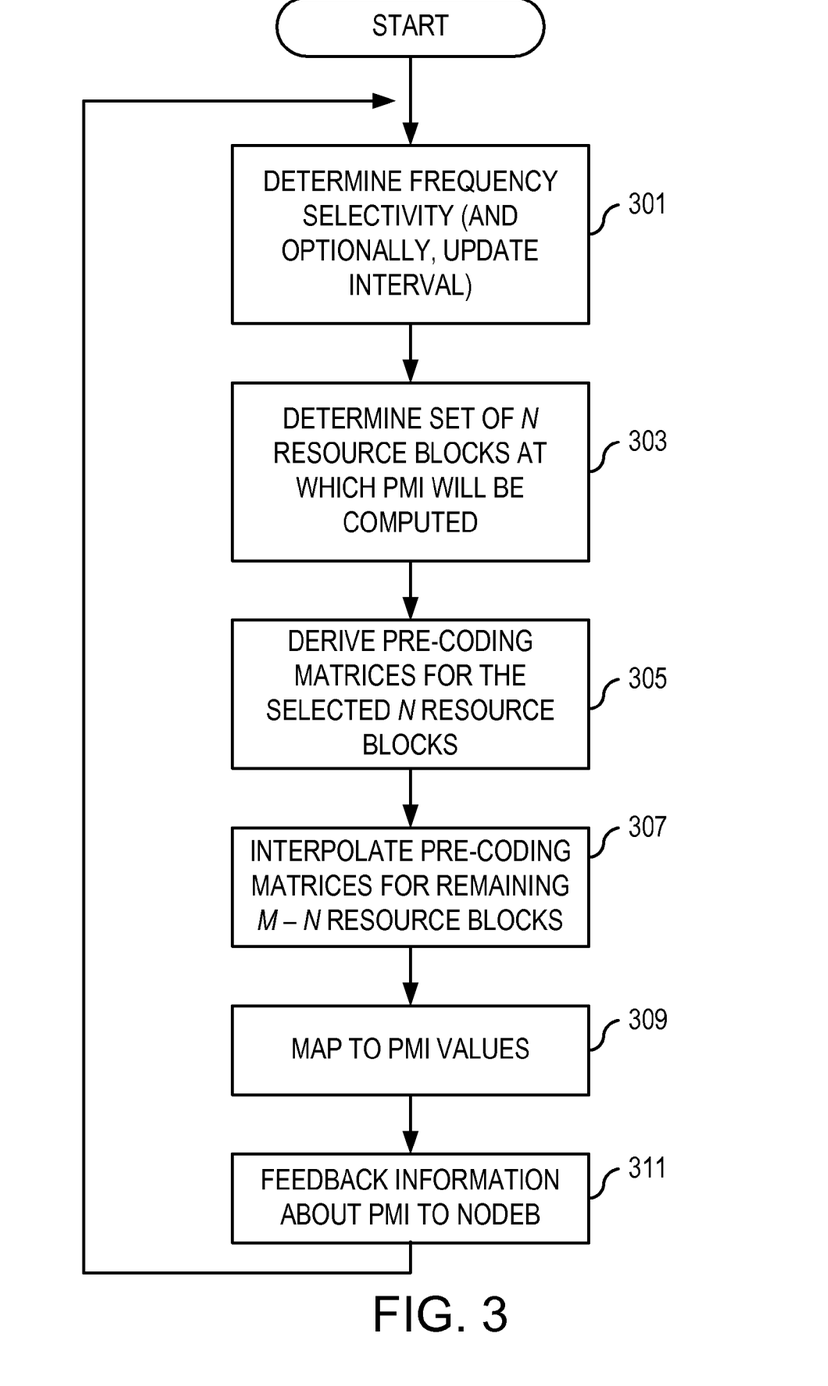
FIG. 3 is a flowchart depicting steps carried out by suitable logic in embodiments consistent with the invention.

FIG. 3 is a flowchart depicting steps carried out on a regular basis by suitable logic (e.g., PMI computation logic 117 in a UE) in embodiments consistent with the invention. Such logic can be implemented as an all-hardware solution, or alternatively can be processing circuitry or other programmable logic performing steps coded in a set of program instructions.

The process begins by determining the frequency selectivity of the radio channel and update interval (step 301). Frequency selectivity can be determined by any of a number of methods. For example, it can be derived from the delay spread of the radio channel, which can be determined in accordance with known techniques. The delay spread is the time difference between the first significant radio path and the last significant radio path.

Alternatively, the frequency selectivity can be determined from the Power Delay Profile (PDP) of the channel. The PDP can be determined by known methods. The PDP gives the entire radio channel structure, and therefore provides more information than the delay spread (e.g., the frequency-domain response of the channel can be derived from the PDP, which can be useful in other parts of the receiver). However, determining the PDP requires greater effort than determining the delay spread.

The update interval can be set to a fixed value, which does not require dynamic determination. However, in alternative embodiments, it can be determined dynamically based on the Doppler frequency error, which gives an indication of how quickly the channel is changing. The more quickly it changes, the more frequently the PMIs should be updated.

Figure 4A:
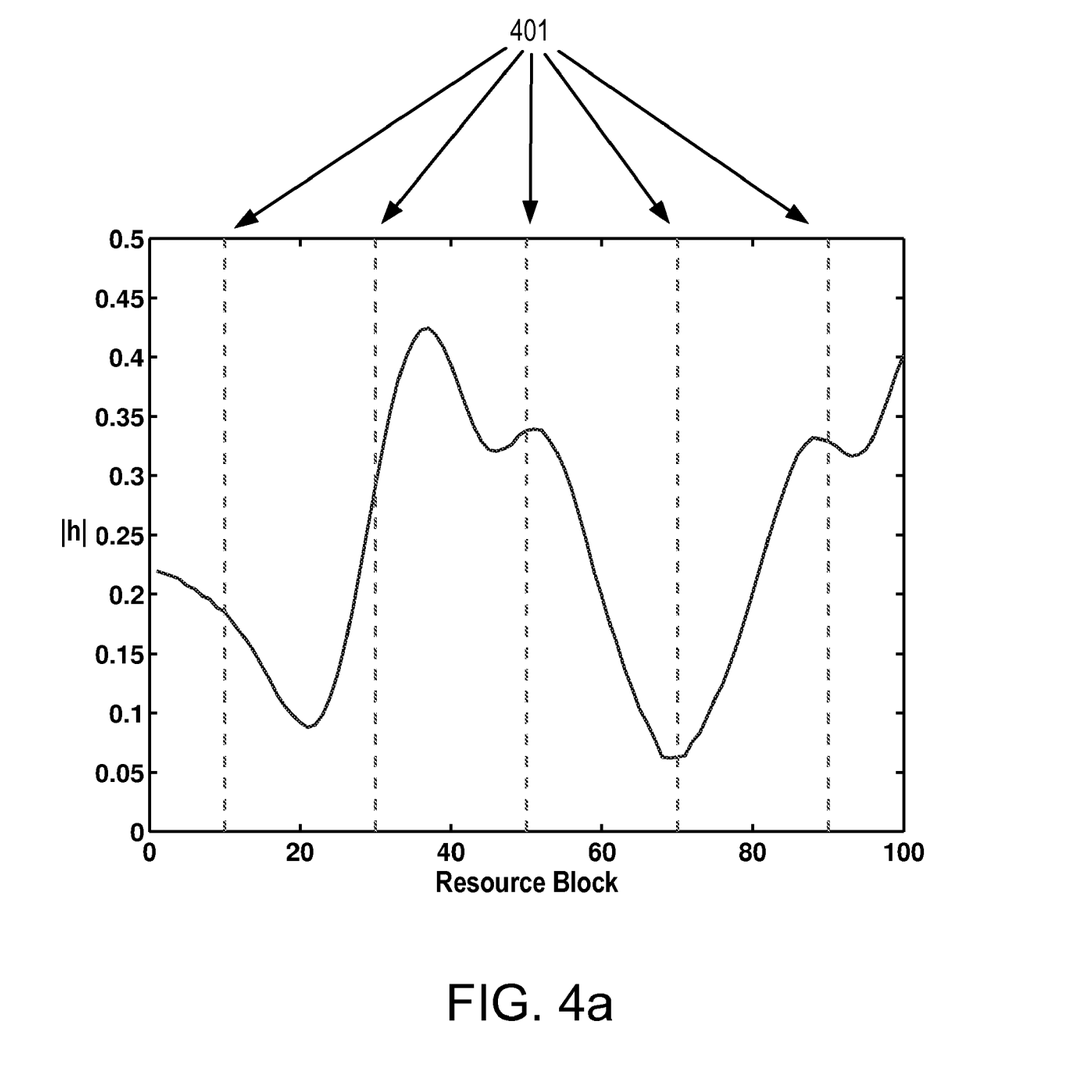
FIG. 4a is a graph of an exemplary channel estimate and shows five equidistantly spaced selected resource blocks at which a PMI will be determined in accordance with an embodiment of the invention.

In an aspect of embodiments consistent with the invention, the amount of frequency selectivity is used to determine the number, N, of resource blocks out of a total number, M, of resource blocks at which the PMI will be determined (step 303). The location of these resource blocks can be determined in a number of different ways. For example, in some embodiments the N resource blocks are spaced equidistant from one another. Such placement is illustrated in FIG. 4*a*, which shows an exemplary channel estimate and five equidistantly spaced selected resource blocks 401 at which the PMI will be determined.

Figure 4B:
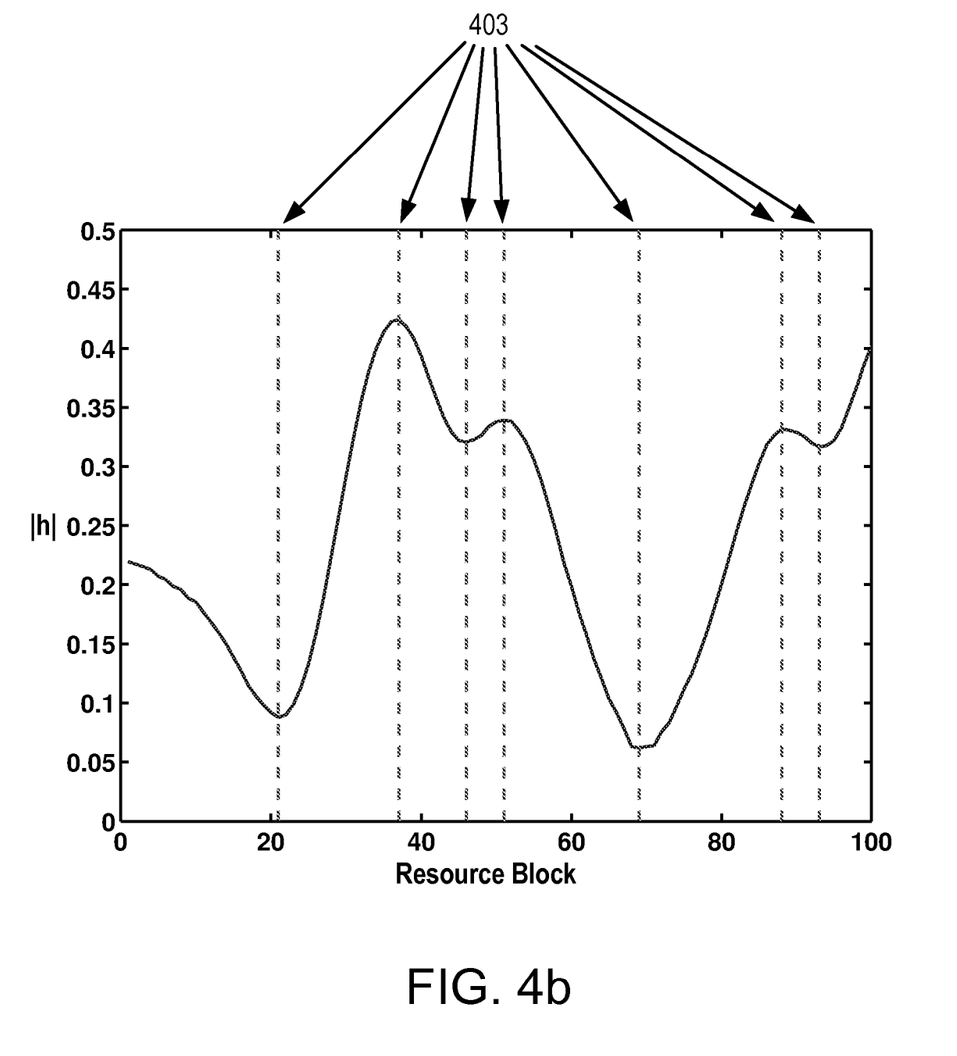
FIG. 4b is a graph of an exemplary channel estimate and shows seven selected resource blocks associated with those places in the exemplary channel estimate at which its derivative is zero, in accordance with another embodiment of the invention.

In alternative embodiments, the N resource blocks are positioned at those resource blocks at which the derivative of the channel estimate is zero. Such placement is illustrated in FIG. 4*b*, which shows the same exemplary channel estimate as in FIG. 4*b*, but with seven selected resource blocks 403 associated with those places in the exemplary channel estimate at which its derivative is zero.

Still other alternatives are also useful. For example, the N resource blocks can be positioned at resource blocks for which the real or complex part of the channel estimate changes sign. In yet other alternative embodiments, the N resource blocks are positioned at those resource blocks at which the derivative of the channel estimate is large. In practice, this means determining whether the derivative of the channel estimate is greater than a threshold amount.

Referring back to FIG. 3, once the resource blocks for which the PMI will be determined have been selected, the pre-coding matrix is derived at these locations (step 305). This can be done by, for example, maximizing the SNRs on codeword 1 at the selected resource blocks. For example, consider the case in which there are two transmit antennas and two receiver antennas. The mathematical model for a signal at resource block i is:

$$Y_i = H_i W_i s + E_i,$$

where $Y_i$ (a 2×1 vector) is the received frequency-domain signal, $H_i$ is a 2×2 channel matrix, $E_i$ is a 2×1 noise vector, $W_i$ is a pre-coding matrix (2×2 if two codewords and two antennas (MIMO) are utilized, otherwise 2×1), and s is a codeword (2×1 if MIMO, or 1×1 otherwise).

To determine the pre-coding matrix $W_i$, one typically maximizes the signal power:

$$\max_{W_i}(D = \text{diag}(W_i^H \cdot H_i^H \cdot H_i \cdot W_i)),$$

where D is 1×1 if one codeword and 2×1 if two codewords. For the case of only one codeword, finding the maximum is straightforward.

For the case of two codewords, one can for example maximize signal power in just the first (or second) codeword (i.e., find $$\max_{W_i}(D_1).$$

This is a low complexity solution that is useful under conditions in which if one codeword is good the other one is also good.

An alternative is to maximize the norm (e.g., the sum of power of element, e.g., $|D|=|Q_{11}|+|Q_{22}|$, where $Q_{ii}$ is the (i,i) element in matrix $$Q = W_i^H \cdot H_i^H \cdot H_i \cdot W_i) \text{ over } D(\text{i.e., determine } \max_{W_i}(|D|).$$

Once the pre-coding matrix has been determined for each of the N selected resource blocks, the pre-coding matrices for the remaining (i.e., the M–N non-selected) resource blocks are derived by interpolation (step 307). For example, a zero order hold technique can be used. Alternatively, the value of the pre-coding matrix of the closest neighboring resource block can be used. In still other alternatives, linear interpolation with quantization to the nearest one of the pre-coding matrices within the defined codebook (see, e.g., FIG. 2) can be used.

Once the pre-coding matrices have been determined for all M resource blocks, these are mapped to PMI values (step 309). Information about the PMIs is then fed back to the NodeB (step 311), and the process repeats beginning at step 301.

Figure 5:
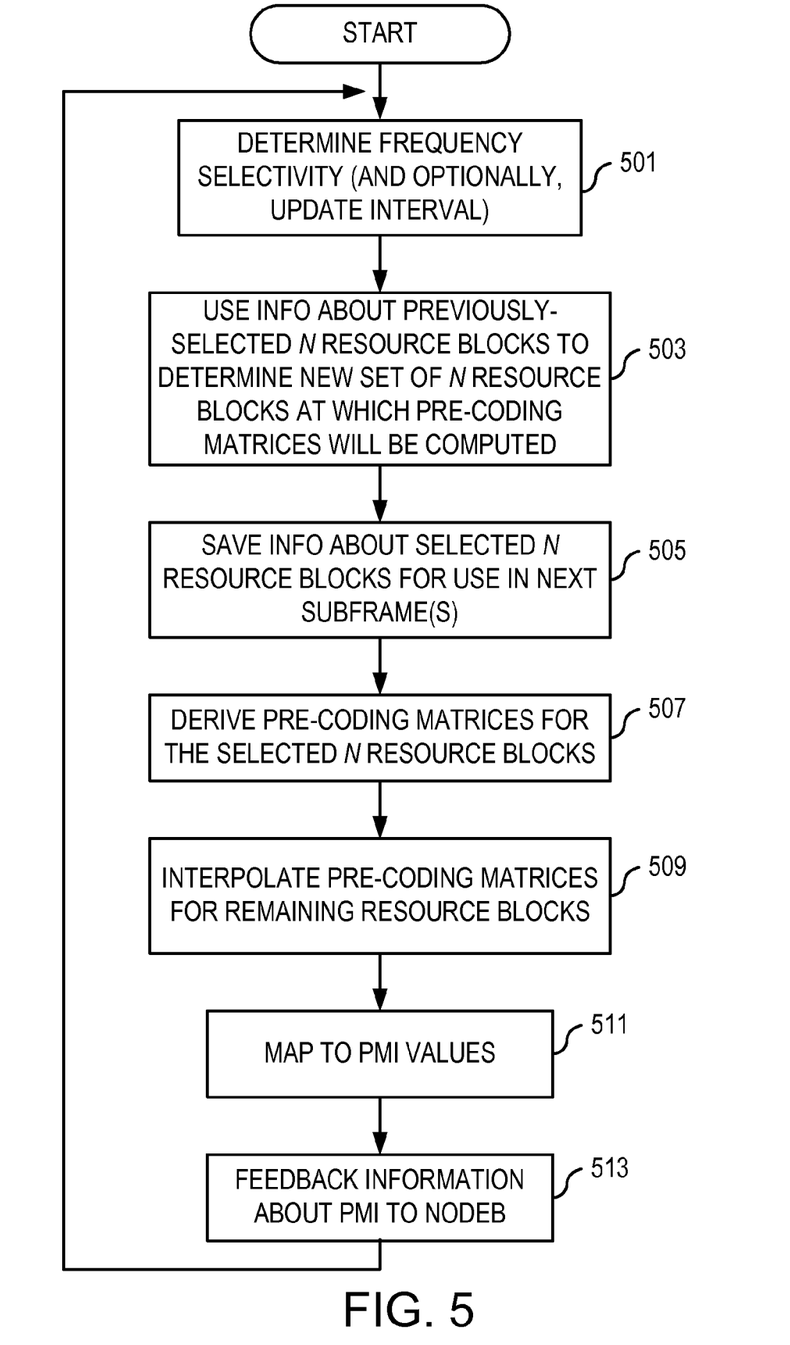
FIG. 5 is a flowchart depicting steps carried out by suitable logic in alternative embodiments consistent with the invention.

FIG. 5 is a flowchart depicting steps carried out on a regular basis by suitable logic (e.g., PMI computation logic 117 in a UE) in alternative embodiments consistent with the invention. The process begins with determining the frequency selectivity of the radio channel and the update interval (step 501). Frequency selectivity can be determined by any of a number of methods. For example, it can be derived from the delay spread of the radio channel, which can be determined in accordance with known techniques.

Alternatively, the frequency selectivity can be determined from the Power Delay Profile (PDP) of the channel. The PDP can be determined by known methods.

The update interval can be set to a fixed value, which does not require dynamic determination. However, in alternative embodiments, it can be determined dynamically based on the Doppler frequency error, which gives an indication of how quickly the channel is changing. The more quickly it changes, the more frequently the PMIs should be updated.

In an aspect of embodiments consistent with the invention, the amount of frequency selectivity as well as information about a previously selected set of N resource blocks is used to determine a new set of N resource blocks out of a total number, M, of resource blocks at which the PMI will be determined (step 503). The previously selected set of N resource blocks can be those derived in a last subframe or on a last occasion when the PMIs needed to be derived. This information is retrieved from a memory where it was stored when the PMIs were derived. For example, if in a previous (e.g., last-performed) update procedure pre-coding matrices were determined for resource blocks 0, 4, 8, and 12, these would be avoided in this update and pre-coding matrices would be determined for different resource blocks (e.g., 2, 6, 10, and 14).

Once the resource blocks for which the PMI will be determined have been selected, information about them is saved in a memory for use the next time a set of PMIs needs to be derived (step 505). Also, the pre-coding matrices are determined at the selected set of N resource blocks (step 507). This can be done by, for example, maximizing the SNRs on codeword 1 at the selected resource blocks. This and other ways of generating a pre-coding matrix for a particular resource block are known in the art, and need not be described here in detail.

Once the pre-coding matrix has been determined for each of the N selected resource blocks, the pre-coding matrices for the remaining resource blocks are derived by interpolation (step 509). In this case, pre-coding matrices determined in the last update procedure can be re-used (in the above example, those for resource blocks 0, 4, 8, and 12) so that the remaining resource blocks are those for which no pre-coding matrices were determined either this time or last time. In this exemplary embodiment, there would be M−2N of them.

Interpolation can be performed in any of a number of ways. For example, a zero order hold technique can be used. Alternatively, the pre-coding matrix of the closest neighboring resource block can be used. In still other alternatives, linear interpolation with quantization to the nearest pre-coding matrix can be used.

Once pre-coding matrices have been determined for all M resource blocks, these are mapped to PMI values (step 511). Information about the PMIs is fed back to the NodeB (step 513), and the process repeats beginning at step 501.

Figure 6:
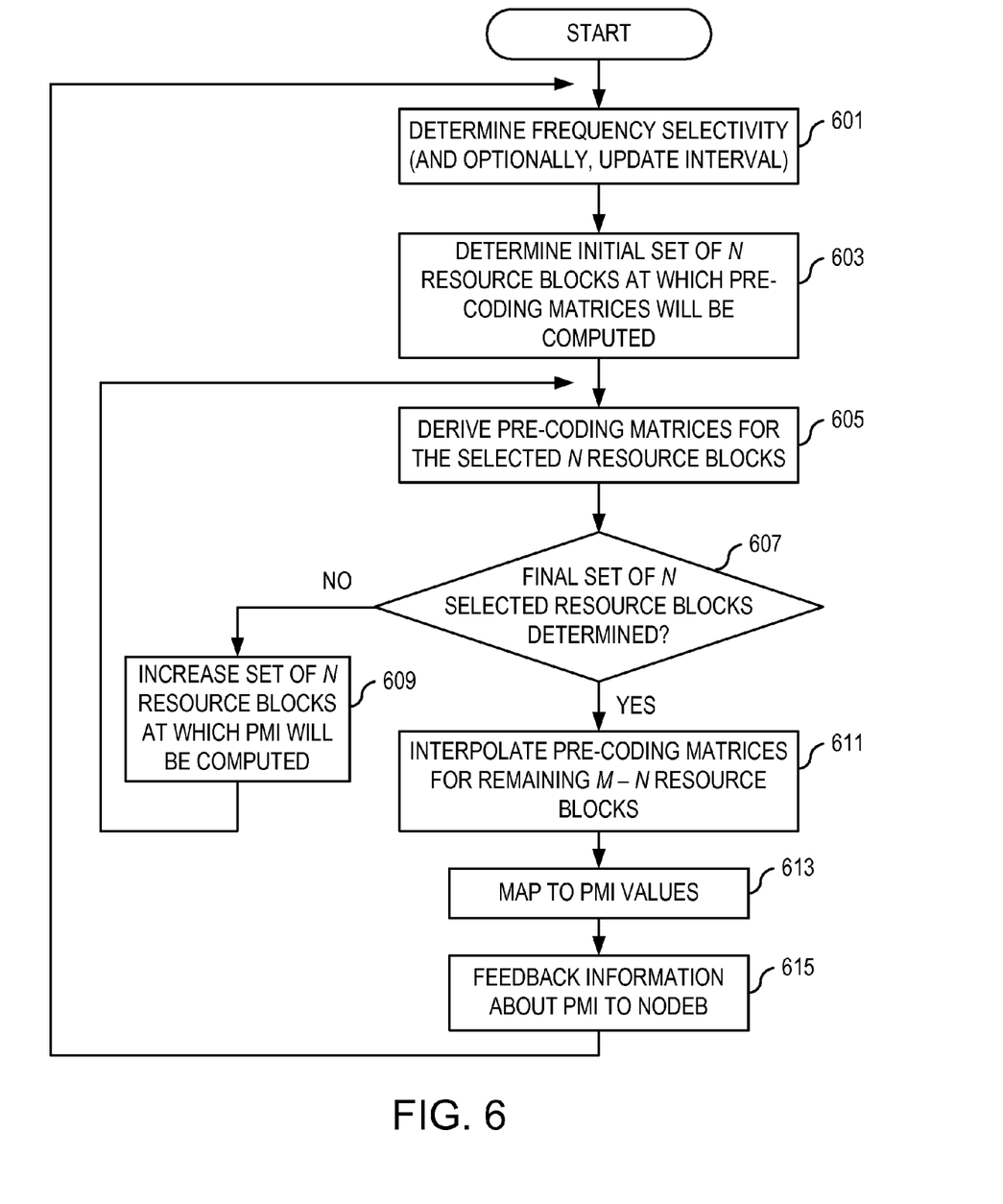
FIG. 6 is a flowchart depicting steps carried out by suitable logic in still other alternative embodiments consistent with the invention.

FIG. 6 is a flowchart depicting steps carried out on a regular basis by suitable logic (e.g., PMI computation logic 117 in a UE) in still other alternative embodiments consistent with the invention. The process begins with determining the frequency selectivity and the update interval (step 601). Frequency selectivity can be determined by any of a number of methods. For example, it can be derived from the delay spread of the radio channel, which can be determined in accordance with known techniques.

Alternatively, the frequency selectivity can be determined from the Power Delay Profile (PDP) of the channel. The PDP can be determined by known methods.

The update interval can be set to a fixed value, which does not require dynamic determination. However, in alternative embodiments, it can be determined dynamically based on the Doppler frequency error, which gives an indication of how quickly the channel is changing. The more quickly it changes, the more frequently the PMIs should be updated.

In an aspect of embodiments consistent with the invention, iterative techniques and the amount of frequency selectivity are used to determine a set of N resource blocks out of a total number, M, of resource blocks at which the PMI will be determined. In this exemplary embodiment, this is achieved by first determining an initial set of N resource blocks that form a coarse grid over the entire set of M resource blocks (step 603).

Once the resource blocks for which the PMI will be determined have been selected, the pre-coding matrices are determined at each of the selected set of N resource blocks (step 605). This can be done by, for example, maximizing the SNRs on stream 1 at the selected resource blocks. This and other ways of generating a pre-coding matrix for a particular resource block are known in the art, and need not be described here in detail.

It is next determined whether more resource blocks need to be selected to complete the iterative process (decision block 607). This can by achieved by, for example, comparing the pre-coding matrices for neighboring ones of the N selected resource blocks. It a pair of these differs by more than a predefined threshold amount, then more resource blocks need to be selected to complete the iterative process ("NO" path out of decision block 607). To increase the set of N resource blocks at which the PMI will be computed (step 609), a new grid point is inserted in-between those pairs of resource blocks whose computed pre-coding matrices differed by more than the threshold amount. Processing then reverts back to step 603 where the iterative process is repeated.

However, if a final set of N selected resource blocks has been determined ("YES" path out of decision block 607), the pre-coding matrices for the remaining (i.e., the M–N non-selected) resource blocks are derived by interpolation (step 611). For example, a zero order hold technique can be used. Alternatively, the value of the pre-coding matrix of the closest neighboring resource block can be used. In still other alternatives, linear interpolation with quantization to the nearest pre-coding matrix can be used.

Once PMI values have been determined for all M resource blocks, the M pre-coding matrices are mapped to PMI values (step 613). Information about the PMIs is then fed back to the NodeB (step 615), and the process repeats beginning at step 601.

Thus, in embodiments that utilize iteration, a coarse grid is initially used and is made finer and finer in areas in which the PMI is changing and for which interpolation would be unsuitable.

Figure 7:
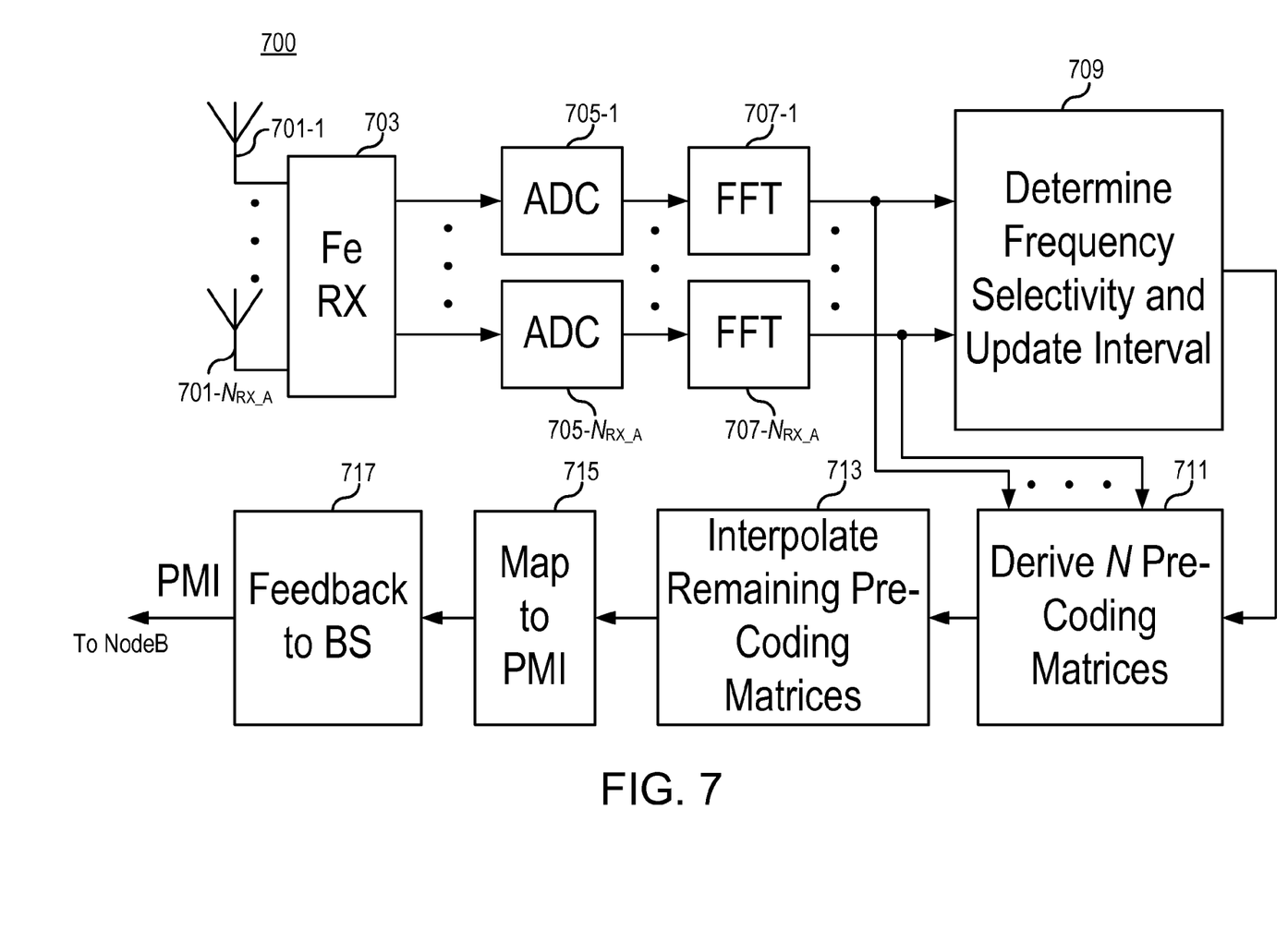
FIG. 7 is a block diagram of a UE containing exemplary logic configured to carry out aspects of the invention.

FIG. 7 is a block diagram of a UE 700 containing exemplary logic configured to carry out aspects of the invention. The UE 700 includes a plurality, $N_{RX\_A}$, of receiver antennas 701-1, ..., 701-$N_{RX\_A}$ that feed the received signals to a front end receiver (Fe RX) 703, which down converts each of the received signals to baseband and then processes those baseband signals by means of analog low pass filtering. Each of the $N_{RX\_A}$ baseband analog signals generated by the front end receiver 703 is converted into a digital signal by a respective one of $N_{RX\_A}$ analog-to-digital converters (ADC) 705-1, ..., 705-$N_{RX\_A}$.

Next, $N_{RX\_A}$ sets of logic configured to perform a Fast Fourier Transform 707-1, ..., 707-$N_{RX\_A}$ recover the modulation symbols from each of the received signals. The modulation symbols are supplied to logic configured to determine the frequency selectivity of the channel and update interval 709 to be used when generating the PMIs.

The logic configured to determine the frequency selectivity of the channel and update interval 709 determines frequency selectivity in any of a number of ways, as discussed above. For example, frequency selectivity can be determined from delay spread information, or from a PDP of the radio channel. The update interval can, as explained earlier, be set to a predetermined static value, or alternatively can be dynamically determined based, for example, on a Doppler error estimate of the radio channel.

The signals representing the level of frequency selectivity of the channel and the update interval are supplied to logic configured to derive a set of N pre-coding matrices 711 for N out of M possible resource blocks (N≦M) 711. The logic configured to derive N pre-coding matrices 711 also receives the output from the logic configured to perform a Fast Fourier Transform 707-1, ..., 707-$N_{RX\_A}$.

The logic configured to derive pre-coding matrices 711 derives pre-coding matrices for only N selected ones out of a possible total number, M, of resource blocks. The determination of the number N, as well as the selection of which resource blocks will be used, is made in accordance with any of the techniques described above (e.g., illustrated by FIGS. 3, 5, and 6).

The pre-coding matrices for the set of N selected resource blocks are supplied to logic configured to interpolate the pre-coding matrices for the remaining M–N resource blocks 713. The complete set of M pre-coding matrices is then supplied to logic configured to map these to PMI values 715. Information about the PMI values is then supplied to logic configured to feed this information back to the NodeB 717, where it is used as described earlier in the Background section of this specification.

The various embodiments consistent with the invention make it possible to reduce the PMI computation complexity by a considerable amount. This in turn makes it possible to reduce Digital Signal Processor (DSP) resources and, ultimately, power consumption and cost of implementation.

The various aspects of embodiments consistent with the invention enable PMI computation complexity to be kept low while still maintaining good throughput performance.

The invention has been described with reference to particular embodiments. However, it will be readily apparent to those skilled in the art that it is possible to embody the invention in specific forms other than those of the embodiment described above. The described embodiments are merely illustrative and should not be considered restrictive in any way. The scope of the invention is given by the appended claims, rather than the preceding description, and all variations and equivalents which fall within the range of the claims are intended to be embraced therein.

What is claimed is:

1. A method of determining a pre-coding matrix in an Orthogonal Frequency Division Multiple Access (OFDMA) communication system having a plurality of sub-carriers grouped into a number, M, of resource blocks, wherein the communication system employs a plurality of transmit antennas, the method comprising:

determining a frequency selectivity of a channel through which received signals have propagated;

determining, as a function of the frequency selectivity, a number N of selected resource blocks for which pre-coding matrices will be determined, wherein N<M;

determining the pre-coding matrices for the N selected resource blocks;

determining pre-coding matrices for a remaining M–N of the M resource blocks by means of interpolation applied to the N pre-coding matrices determined for the N selected resource blocks;

determining a Doppler error estimate of received signals; and using the Doppler error estimate to determine a pre-coding matrix update interval.

2. The method of claim 1, wherein determining the frequency selectivity of the channel through which received signals have propagated comprises:
   determining a delay spread of the channel through which received signals have propagated; and
   determining the frequency selectivity based, at least in part, on the delay spread.

3. The method of claim 1, wherein determining the frequency selectivity of the channel through which received signals have propagated comprises:
   determining a power delay profile of the channel through which received signals have propagated; and
   determining the frequency selectivity based, at least in part, on the power delay profile.

4. The method of claim 1, wherein determining, as a function of the frequency selectivity, the number N of selected resource blocks for which pre-coding matrices will be determined, wherein N<M, comprises:
   determining a value for N; and
   determining an equidistantly-spaced set of N of the M resource blocks.

5. The method of claim 1, wherein determining the pre-coding matrices for the N selected resource blocks comprises:
   determining a channel response of a channel through which received signals have propagated, wherein the channel response spans sub-carriers associated with the M resource blocks; and
   determining the pre-coding matrices for the N selected resource blocks from the channel response.

6. The method of claim 1, wherein the communication system is a Multi-Input Multi-Output (MIMO) communication system.

7. A method of determining a pre-coding matrix in an Orthogonal Frequency Division Multiple Access (OFDMA) communication system having a plurality of sub-carriers grouped into a number, M, of resource blocks, wherein the communication system employs a plurality of transmit antennas, the method comprising:
   determining a frequency selectivity of a channel through which received signals have propagated;
   determining, as a function of the frequency selectivity, a number N of selected resource blocks for which pre-coding matrices will be determined, wherein N<M;
   determining the pre-coding matrices for the N selected resource blocks; and
   determining pre-coding matrices for a remaining M–N of the M resource blocks by means of interpolation applied to the N pre-coding matrices determined for the N selected resource blocks,
   wherein determining, as a function of the frequency selectivity, the number N of selected resource blocks for which pre-coding matrices will be determined, wherein N<M, comprises:
   determining a channel response of a channel through which received signals have propagated, wherein the channel response spans sub-carriers associated with the M resource blocks; and
   determining which resource blocks are associated with sub-carriers at which a derivative of the channel response is zero.

8. A method of determining a pre-coding matrix in an Orthogonal Frequency Division Multiple Access (OFDMA) communication system having a plurality of sub-carriers grouped into a number, M, of resource blocks, wherein the communication system employs a plurality of transmit antennas, the method comprising:
   determining a frequency selectivity of a channel through which received signals have propagated;
   determining, as a function of the frequency selectivity, a number N of selected resource blocks for which pre-coding matrices will be determined, wherein N<M;
   determining the pre-coding matrices for the N selected resource blocks; and
   determining pre-coding matrices for a remaining M–N of the M resource blocks by means of interpolation applied to the N pre-coding matrices determined for the N selected resource blocks,
   wherein determining, as a function of the frequency selectivity, the number N of selected resource blocks for which pre-coding matrices will be determined, wherein N<M, comprises:
   determining a channel response of a channel through which received signals have propagated, wherein the channel response spans sub-carriers associated with the M resource blocks; and
   determining which resource blocks are associated with sub-carriers at which the channel response changes sign.

9. A method of determining a pre-coding matrix in an Orthogonal Frequency Division Multiple Access (OFDMA) communication system having a plurality of sub-carriers grouped into a number, M, of resource blocks, wherein the communication system employs a plurality of transmit antennas, the method comprising:
   determining a frequency selectivity of a channel through which received signals have propagated;
   determining, as a function of the frequency selectivity, a number N of selected resource blocks for which pre-coding matrices will be determined, wherein N<M;
   determining the pre-coding matrices for the N selected resource blocks; and
   determining pre-coding matrices for a remaining M–N of the M resource blocks by means of interpolation applied to the N pre-coding matrices determined for the N selected resource blocks,
   wherein determining, as a function of the frequency selectivity, the number N of selected resource blocks for which pre-coding matrices will be determined, wherein N<M, comprises:
   determining a channel response of a channel through which received signals have propagated, wherein the channel response spans sub-carriers associated with the M resource blocks; and
   determining which resource blocks are associated with sub-carriers at which a derivative of the channel response is greater than a threshold amount.

10. A method of determining a pre-coding matrix in an Orthogonal Frequency Division Multiple Access (OFDMA) communication system having a plurality of sub-carriers grouped into a number, M, of resource blocks, wherein the communication system employs a plurality of transmit antennas, the method comprising:
    determining a frequency selectivity of a channel through which received signals have propagated;
    determining, as a function of the frequency selectivity, a number N of selected resource blocks for which pre-coding matrices will be determined, wherein N<M;
    determining the pre-coding matrices for the N selected resource blocks; and determining pre-coding matrices for a remaining M−N of the M resource blocks by means of interpolation applied to the N pre-coding matrices determined for the N selected resource blocks, wherein determining, as a function of the frequency selectivity, the number N of selected resource blocks for which pre-coding matrices will be determined, wherein N<M, comprises:

using information about a previously determined set of N selected resource blocks for which pre-coding matrices were determined.

11. A method of determining a pre-coding matrix in an Orthogonal Frequency Division Multiple Access (OFDMA) communication system having a plurality of sub-carriers grouped into a number, M, of resource blocks, wherein the communication system employs a plurality of transmit antennas, the method comprising:

determining a frequency selectivity of a channel through which received signals have propagated;

determining, as a function of the frequency selectivity, a number N of selected resource blocks for which pre-coding matrices will be determined, wherein N<M;

determining the pre-coding matrices for the N selected resource blocks; and determining pre-coding matrices for a remaining M−N of the M resource blocks by means of interpolation applied to the N pre-coding matrices determined for the N selected resource blocks, wherein determining, as a function of the frequency selectivity, the number N of selected resource blocks for which pre-coding matrices will be determined, wherein N<M, comprises:

determining a coarse grid of resource blocks;

determining pre-coding matrices for the coarse grid of resource blocks;

determining additional resource blocks associated with sub-carriers located between pairs of the N selected resource blocks whose determined pre-coding matrices differ by more than a threshold amount; and determining pre-coding matrices for the additional resource blocks.

12. An apparatus for determining a pre-coding matrix in an Orthogonal Frequency Division Multiple Access (OFDMA) communication system having a plurality of sub-carriers grouped into a number, M, of resource blocks, wherein the communication system employs a plurality of transmit antennas, the apparatus comprising:

logic configured to determine a frequency selectivity of a channel through which received signals have propagated;

logic configured to determine, as a function of the frequency selectivity, a number N of selected resource blocks for which pre-coding matrices will be determined, wherein N<M;

logic configured to determine the pre-coding matrices for the N selected resource blocks;

logic configured to determine pre-coding matrices for a remaining M−N of the M resource blocks by means of interpolation applied to the N pre-coding matrices determined for the N selected resource blocks;

logic configured to determine a Doppler error estimate of received signals; and logic configured to use the Doppler error estimate to determine a pre-coding matrix update interval.

13. The apparatus of claim 12, wherein the logic configured to determine the frequency selectivity of the channel through which received signals have propagated comprises:

logic configured to determine a delay spread of the channel through which received signals have propagated; and logic configured to determine the frequency selectivity based, at least in part, on the delay spread.

14. The apparatus of claim 12, wherein the logic configured to determine the frequency selectivity of the channel through which received signals have propagated comprises:

logic configured to determine a power delay profile of the channel through which received signals have propagated; and logic configured to determine the frequency selectivity based, at least in part, on the power delay profile.

15. The apparatus of claim 12, wherein the logic configured to determine, as a function of the frequency selectivity, the number N of selected resource blocks for which pre-coding matrices will be determined, wherein N<M, comprises:

logic configured to determine a value for N; and logic configured to determine an equidistantly-spaced set of N of the M resource blocks.

16. The apparatus of claim 12, wherein the logic configured to determine the pre-coding matrices for the N selected resource blocks comprises:

logic configured to determine a channel response of a channel through which received signals have propagated, wherein the channel response spans sub-carriers associated with the M resource blocks; and logic configured to determine the pre-coding matrices for the N selected resource blocks from the channel response.

17. The apparatus of claim 12, wherein the communication system is a Multi-Input Multi-Output (MIMO) communication system.

18. An apparatus for determining a pre-coding matrix in an Orthogonal Frequency Division Multiple Access (OFDMA) communication system having a plurality of sub-carriers grouped into a number, M, of resource blocks, wherein the communication system employs a plurality of transmit antennas, the apparatus comprising:

logic configured to determine a frequency selectivity of a channel through which received signals have propagated;

logic configured to determine, as a function of the frequency selectivity, a number N of selected resource blocks for which pre-coding matrices will be determined, wherein N<M;

logic configured to determine the pre-coding matrices for the N selected resource blocks; and logic configured to determine pre-coding matrices for a remaining M−N of the M resource blocks by means of interpolation applied to the N pre-coding matrices determined for the N selected resource blocks, wherein the logic configured to determine, as a function of the frequency selectivity, the number N of selected resource blocks for which pre-coding matrices will be determined, wherein N<M, comprises:

logic configured to determine a channel response of a channel through which received signals have propagated, wherein the channel response spans sub-carriers associated with the M resource blocks; and logic configured to determine which resource blocks are associated with sub-carriers at which a derivative of the channel response is zero.

19. An apparatus for determining a pre-coding matrix in an Orthogonal Frequency Division Multiple Access (OFDMA) communication system having a plurality of sub-carriers grouped into a number, M, of resource blocks, wherein the communication system employs a plurality of transmit antennas, the apparatus comprising:

logic configured to determine a frequency selectivity of a channel through which received signals have propagated;

logic configured to determine, as a function of the frequency selectivity, a number N of selected resource blocks for which pre-coding matrices will be determined, wherein N<M;

logic configured to determine the pre-coding matrices for the N selected resource blocks; and     logic configured to determine pre-coding matrices for a remaining M−N of the M resource blocks by means of interpolation applied to the N pre-coding matrices determined for the N selected resource blocks,     wherein the logic configured to determine, as a function of the frequency selectivity, the number N of selected resource blocks for which pre-coding matrices will be determined, wherein N<M, comprises:

logic configured to determine a channel response of a channel through which received signals have propagated, wherein the channel response spans sub-carriers associated with the M resource blocks; and     logic configured to determine which resource blocks are associated with sub-carriers at which the channel response changes sign.

20. An apparatus for determining a pre-coding matrix in an Orthogonal Frequency Division Multiple Access (OFDMA) communication system having a plurality of sub-carriers grouped into a number, M, of resource blocks, wherein the communication system employs a plurality of transmit antennas, the apparatus comprising:

logic configured to determine a frequency selectivity of a channel through which received signals have propagated;

logic configured to determine, as a function of the frequency selectivity, a number N of selected resource blocks for which pre-coding matrices will be determined, wherein N<M;

logic configured to determine the pre-coding matrices for the N selected resource blocks; and     logic configured to determine pre-coding matrices for a remaining M−N of the M resource blocks by means of interpolation applied to the N pre-coding matrices determined for the N selected resource blocks,     wherein the logic configured to determine, as a function of the frequency selectivity, the number N of selected resource blocks for which pre-coding matrices will be determined, wherein N<M, comprises:

logic configured to determine a channel response of a channel through which received signals have propagated, wherein the channel response spans sub-carriers associated with the M resource blocks; and     logic configured to determine which resource blocks are associated with sub-carriers at which a derivative of the channel response is greater than a threshold amount.

21. An apparatus for determining a pre-coding matrix in an Orthogonal Frequency Division Multiple Access (OFDMA) communication system having a plurality of sub-carriers grouped into a number, M, of resource blocks, wherein the communication system employs a plurality of transmit antennas, the apparatus comprising:

logic configured to determine a frequency selectivity of a channel through which received signals have propagated;

logic configured to determine, as a function of the frequency selectivity, a number N of selected resource blocks for which pre-coding matrices will be determined, wherein N<M;

logic configured to determine the pre-coding matrices for the N selected resource blocks; and     logic configured to determine pre-coding matrices for a remaining M−N of the M resource blocks by means of interpolation applied to the N pre-coding matrices determined for the N selected resource blocks,     wherein the logic configured to determine, as a function of the frequency selectivity, the number N of selected resource blocks for which pre-coding matrices will be determined, wherein N<M, comprises:

logic configured to use information about a previously determined set of N selected resource blocks for which pre-coding matrices were determined.

22. An apparatus for determining a pre-coding matrix in an Orthogonal Frequency Division Multiple Access (OFDMA) communication system having a plurality of sub-carriers grouped into a number, M, of resource blocks, wherein the communication system employs a plurality of transmit antennas, the apparatus comprising:

logic configured to determine a frequency selectivity of a channel through which received signals have propagated;

logic configured to determine, as a function of the frequency selectivity, a number N of selected resource blocks for which pre-coding matrices will be determined, wherein N<M;

logic configured to determine the pre-coding matrices for the N selected resource blocks; and     logic configured to determine pre-coding matrices for a remaining M−N of the M resource blocks by means of interpolation applied to the N pre-coding matrices determined for the N selected resource blocks,     wherein the logic configured to determine, as a function of the frequency selectivity, the number N of selected resource blocks for which pre-coding matrices will be determined, wherein N<M, comprises:

logic configured to determine a coarse grid of resource blocks;

logic configured to determine pre-coding matrices for the coarse grid of resource blocks;

logic configured to determine additional resource blocks associated with sub-carriers located between pairs of the N selected resource blocks whose determined pre-coding matrices differ by more than a threshold amount; and     logic configured to determine pre-coding matrices for the additional resource blocks.

* * * * *

UNITED STATES PATENT AND TRADEMARK OFFICE
CERTIFICATE OF CORRECTION

PATENT NO. : 7,965,780 B2
APPLICATION NO. : 11/957118
DATED : June 21, 2011
INVENTOR(S) : Lindoff et al.

Page 1 of 1

It is certified that error appears in the above-identified patent and that said Letters Patent is hereby corrected as shown below:

In Column 9, Line 19, delete "can by" and insert -- can be --, therefor.

Signed and Sealed this
Twelfth Day of June, 2012

David J. Kappos
*Director of the United States Patent and Trademark Office*